US006909742B1

United States Patent
Leonosky

(10) Patent No.: US 6,909,742 B1
(45) Date of Patent: Jun. 21, 2005

(54) METHOD AND APPARATUS FOR REDUCING INTERFERENCE IN A DATA STREAM USING AUTOCORRELATION DERIVED EQUALIZATION

(75) Inventor: Thomas J. Leonosky, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/789,622

(22) Filed: Feb. 27, 2004

Related U.S. Application Data

(63) Continuation-in-part of application No. 10/419,023, filed on Apr. 17, 2003.

(51) Int. Cl.[7] .......................... H03H 7/30; H04L 27/06; H04L 7/00
(52) U.S. Cl. ...................... 375/232; 375/343; 375/355
(58) Field of Search .............................. 375/285, 346, 375/350, 343, 229, 232, 233, 355; 708/300, 322, 323; 333/28, 18 R

(56) References Cited

U.S. PATENT DOCUMENTS

| | | | | |
|---|---|---|---|---|
| 3,764,914 A | * | 10/1973 | Karnaugh ................... | 375/232 |
| 6,246,732 B1 | * | 6/2001 | Kobayashi et al. .......... | 375/346 |
| 6,647,078 B1 | * | 11/2003 | Thomas et al. ............. | 375/349 |
| 6,754,340 B1 | * | 6/2004 | Ding ...................... | 379/406.08 |

OTHER PUBLICATIONS

Simon Haykin,"adaptive filter Theory, foruth edition," 2002, Prentice Hall, pp203–227.*
Shukia, "Channel–estimation–based adaptive DFE for fading multipath radio channels," IEE Proceeding, vol. 138, No. 6, Dec. 1991, pp 525–543.*

* cited by examiner

*Primary Examiner*—Tesfaldet Bocure
(74) *Attorney, Agent, or Firm*—Workman Nydegger

(57) ABSTRACT

Compensating for channel response in communications systems. An equalizing system includes a correlation block to calculate a correlation statistic from a received signal. The correlation statistic is used by a microcontroller to predict a channel response that includes a number of expansion coefficients. A steepest decent procedure is applied to the expansion coefficients. The steepest decent procedure may include, for example, a bias, or zeroing expansion coefficients by trial and error to remove ghost peaks. The steepest decent procedure produces a number of optimized expansion coefficients. The optimized expansion coefficients are used to create a number of filter coefficients. The filter coefficients are applied to an equalizer. The equalizer compensates for effects of the channel response to produce an equalized output signal.

17 Claims, 5 Drawing Sheets

METHOD AND APPARATUS FOR REDUCING INTERFERENCE IN A DATA STREAM USING AUTOCORRELATION DERIVED EQUALIZATION

CROSS-REFERENCE TO RELATED APPLICATIONS

This application is a continuation in part of, and claims the benefit of prior U.S. application Ser. No. 10/419,023, titled METHOD AND APPARATUS FOR REDUCING INTERFERENCE IN AN OPTICAL DATA STREAM USING DATA-INDEPENDENT EQUALIZATION filed Apr. 17, 2003, which is incorporated herein by reference.

BACKGROUND OF THE INVENTION

1. The Field of the Invention

The present invention relates to reducing interference in a data stream, and more particularly, to a system and method for reducing interference by equalizing a data-stream with an adaptive equalizer.

2. Description of the Related Art

Transmission of data over long distances of optical fiber is limited by interference, such as from multimode dispersion, which limits the usable bandwidth of the fiber. Different modes in a multimode fiber travel at different velocities, which can cause a transmitted signal to be unrecoverable without errors by a standard transceiver. This is particularly problematic for fiber optic systems operating at high data rates over long distances—for example, for fiber for 1310 nm light with 10 Gb/s communications over a distance of 300 m. For this type of system, the usable distance may lie in the range of 60 to 100 meters. But, this is far short of the IEEE standard for 10 Gb Ethernet which, specifies a distance of 300 m for multimode fiber.

At an optical receiver on a multimode fiber, the received signal s(t) looks like a convolution of the originally-transmitted signal r(t) and a channel response h(t). The channel response represents the distortion to a pulse caused by the channel (including the transmitter, fiber, and detector), and is assumed to have a finite duration. Thus, if the channel response can be removed or filtered from the received signal, the originally-transmitted signal can be recovered. The quality of a signal can be represented by using an eye diagram. The eye diagram helps to predict bit error rates (BERs). The more open the eye, the lower the BER. Distortion caused by the channel response, including dispersion in multimode fiber, causes the eye to close.

One particular complication of determining the channel response is that it is time variant, with a time constant thought to be one millisecond or greater (but not known exactly). The channel response variation results from interference between different modes of the fiber, and may be caused by, for example, motion of the fiber or thermal variations along the fiber's length. Also, because fibers are often installed in the ceiling of office buildings, they are generally bent around ventilation ducts, which can lead to the coupling of different modes.

One way to reduce interference from dispersion, like multimode fiber dispersion, is by using an equalizer, which works to filter out channel effects in a signal. An equalizer has a response that counteracts at least a portion of the channel effects. Because the channel effects of multimode dispersion are time-varying, an adaptive equalizer that continuously adjusts for the changes in h(t) may be used. One problem of an adaptive equalizer, however, is that it should be initialized with initial filter coefficients to recover the data clock and to converge on the data signal. This generally requires a training sequence (e.g., a sequence of known data) before the start of data communications. Requiring a training sequence presents an interoperability problem, however, because a transmitter in a device might not know it needs to send a training sequence before initiating communications.

One example of an adaptive feedback equalizer is a decision-feedback equalizer (DFE), which filters the incoming signal and compares it to a threshold value to drive the received signal to a high or a low value. A DFE can be implemented in digital logic, analog circuitry, or a hybrid of both. For example, one way to implement a DFE is to place a high speed (e.g. 10 Gb/s) analog-to-digital (A/D) converter in the signal path, followed by a custom-designed digital circuit to perform signal processing. The key disadvantage of this approach is high power consumption—e.g., an A/D converter at this speed typically requires at least one watt of power, and the digital circuitry typically requires another watt. This high-power consumption precludes the use of this approach in most datacom transceivers.

Another approach for implementing a DFE is to use a complete analog solution with no digital circuitry. In this approach, the least mean square (LMS) algorithm can be used to update tap weights in an analog fashion, storing the values on capacitors and using analog multipliers. There are several disadvantages to this approach, however. First, because the amount of analog circuitry required is extensive, the overall design project becomes complex and prone to error. Second, and more intractable, is the problem of false lock, or failure to converge, without the use of a training sequence. And, the use of a training sequence causes the interoperability problem mentioned above.

Finally, there are hybrid analog-digital approaches to DFEs that still utilize the LMS algorithm or similar techniques. For example, a digital circuit can update tap weights for an analog equalizer in the signal path. The digital circuit in this approach would use the LMS algorithm, with updating information obtained from strategically-placed A/D converters. The tap weights are provided back to the analog filter by digital-to-analog (D/A) converters. While this implementation avoids the high-power problems of the pure-digital approach and the design complexity of the pure-analog approach, there is still the vexing problem of obtaining convergence without a training sequence.

BRIEF SUMMARY OF THE INVENTION

One embodiment of the invention includes a method for reducing the effects of a channel response in an output signal received from across the channel. The method includes measuring the output signal for some period of time. A correlation statistic is calculated from the measured output signal. A channel response is estimated and includes a number of expansion coefficients. Estimating the channel response may further include applying a steepest decent procedure that includes a bias. Alternatively, estimating the channel response may include zeroing out expansion coefficients by trial and error to trim ghost peaks. The steepest decent procedure optimizes the expansion coefficients. An estimated channel response is determined from the optimized expansion coefficients. Filter coefficients for an equalizing filter are generated from the optimized expansion coefficients. The output signal is passed through the equalizing filter to reduce the effects of the channel response to produce an equalized output signal.

Another embodiment of the invention includes a system for reducing the response of a channel on signals passed through the channel. The system includes a correlation block. The correlation block is configured to compute a correlation statistic for a signal received from the channel. The system also includes a microcontroller. The microcontroller is configured to predict a channel response of the channel from the correlation statistic. The channel response includes a number of expansion coefficients. The microcontroller is further configured to apply a steepest decent procedure to the correlation statistic where the steepest decent procedure includes a bias to obtain a channel response that would have given the same measured correlation statistic. Alternatively, the microcontroller may be configured to apply a steepest decent procedure to the correlation statistic where the steepest decent procedure zeroes out expansion coefficients by trial and error. The steepest decent procedure optimizes the expansion coefficients. The system also includes an equalizer connected to the microcontroller for receiving tap weights that are computed by the microcontroller based on an estimation of the channel response. The equalizer is configured to compensate for the effects of the channel response to produce an equalized output signal.

Embodiments of the present invention allow for adaptive filters to be implemented that need only calculate a single correlation statistic. This reduces the amount of hardware needed for implementing the adaptive filter. Further, embodiments of the present invention do not require a training sequence to prepare the adaptive filter. These and other advantages and features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

In this description, the term "subset" is used generally to mean a portion of something, up to and including the entirety of the something.

A. Mathematical Model of the Fiber Transmission System

Figure 1A:
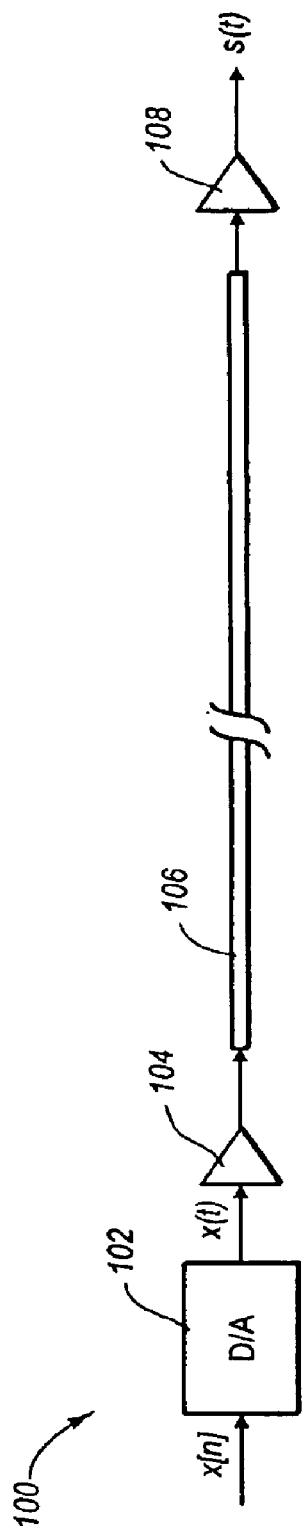
FIG. 1A illustrates a block diagram of a multimode optical transmission system.

Referring to FIG. 1A, a typical multimode optical transmission system 100 includes a digital-to-analog (D/A) converter 102, a transmission amplifier 104, a multimode fiber 106, and a receiver 108. An input bit sequence x[n] is provided to the D/A converter 102, which converts the sequence to an input signal x(t). The transmission amplifier 104 transmits the input signal on the multimode fiber. At the receiving end of the system, the receiver 108 determines an output signal s(t). Ideally, the input bit stream x[n] can be unambiguously recovered from this output signal s(t). In practice, however, this is difficult due to the distorting effects of amplification by amplifier 104, propagation through fiber 106, and reception by receiver 108 of x(t).

Figure 1B:
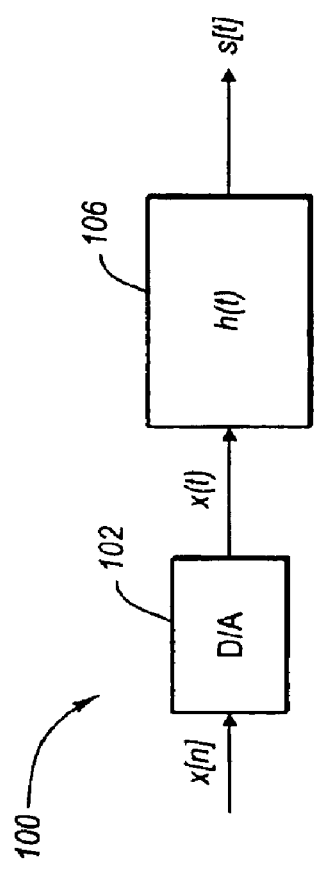
FIG. 1B is a block diagram of a mathematical representation of the transmission system of FIG. 1A.

To determine a mathematical model of the transmission system, it is convenient to group the effects of all distortion into one block. In digital signal processing, an abstract block, known as a "channel" is used to model the distorting effects of the transmission system (i.e. corresponding to the channel response discussed above). FIG. 1B depicts such a mathematical model of the multimode optical transmission system 100 of FIG. 1A. Channel 106 replaces the amplifier, fiber, and receiver of the transmission system. It is assumed in this example that channel 106 introduces linear distortion only, so that the channel can be characterized by the channel impulse response h(t). As discussed, the channel impulse response may vary over time due to, among other possible causes, kinks in the fiber, temporal variations of the fiber, and fluctuations in power supply levels of the transmitter and/or receiver.

As is well known in the art of digital-signal processing (DSP), output signal s(t) is determined as a convolution of the input signal x(t) and the channel impulse response h(t). Mathematically, this relationship can be expressed as:

$$s(t) = x(t) * h(t) = \int_0^\infty x(s)h(t-s)ds$$

This relationship assumes that noise is ignored.

If the channel response is known, the output signal can be employed to produce an accurate estimate of the input signal x(t) and, in turn, the input bit stream x[n]. In practice, however, it is difficult to determine the channel response, especially because it is typically time-varying.

B. Circuit Layout of Channel-Compensating Equalizer

Figure 2:
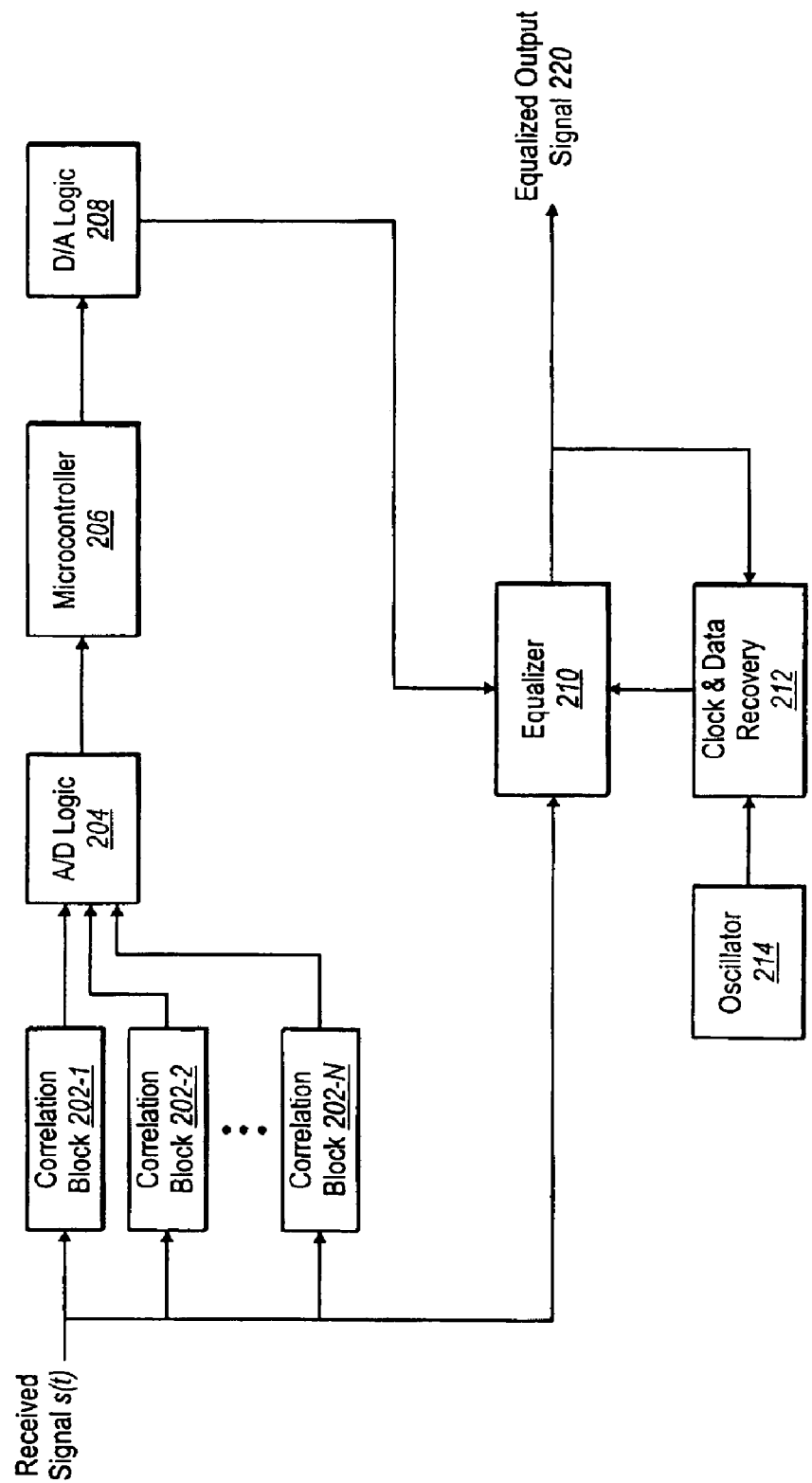
FIG. 2 is a block diagram of an adaptive channel-compensating equalizer, in accordance with an embodiment of the present invention.

Before explaining the functionality of the present invention, a block diagram for one embodiment of the channel-compensating equalizer of the present invention is presented in FIG. 2. As shown in this figure, the incoming signal s(t) is provided as an input to correlation blocks 202-1, 2 . . . N to perform signal analysis, as will be explained in further detail below. (While three correlation blocks are shown, there may be only one, or several different blocks, depending on the specific configuration of the equalizer designed by one of skill-in-the-art). The correlation blocks are preferably implemented in analog logic, but in other embodiments, may also be implemented in digital logic, or in a combination of analog and digital logic. Using analog computational logic allows the signal analysis to occur at a faster speed than with digital processing, and requires less power as well.

An example of the type of computation that a correlation block might perform is: $S_1 = \langle s(t)(t+\delta t)^4 \rangle - \langle s(t) \rangle \langle s(t)^4 \rangle$. To compute this type of a correlation function, the correlation utilizes a delay line (to compute the term that includes the delay $\delta t$), multipliers to multiply terms together to achieve powers, and capacitors to integrate the time-average of the functions. Of course, other types of computational logic may also be used to compute the same function, as appreciated by one of skill in the art. Further, a variety of different types of correlation functions are employed by the present invention.

The output of the correlation blocks is provided to A/D logic 204, which may be a single A/D converter, or multiple A/D converters in parallel. The digital samples of the correlation functions are then provided as an input to microcontroller 206, which deduces enough information from these functions to predict the channel response h(t). The microcontroller then uses the channel response h(t) to generate an initial set of filter coefficients, or tap weights, for the equalizer 210 to compensate for the effects of the channel response. Also, the microcontroller tracks the time-varying aspects of the channel response, and adaptively updates the filter coefficients of the equalizer. Thus, the clock rate of the microcontroller can be slower than the sample rate for the data signal s(t), as long as it is fast enough to provide appropriate adaptive updates to the equalizer 210.

Because the equalizer 210 is an analog equalizer using analog tap weights (in one embodiment), the microcontroller output should be converted to an analog signal by D/A logic 208, which may be a single D/A converter, or multiple D/A converters in parallel. (The determination and application of the tap weights to the equalizer 210, as well as the configuration of the equalizer 210, will be discussed in further detail below in conjunction with FIG. 4).

The data clock is recovered by clock and data recovery (CDR) circuit 212. Local oscillator 214 provides the clock signal. While a CDR circuit typically extracts the data clock from the received signal s(t), in one embodiment of the present invention, the CDR circuit 212 extracts the clock from the equalized output signal 220. This is possible because the equalizer 210 does not obtain convergence or data lock through an error-feedback adaptive algorithm, but rather from the compensation of the channel response by the microcontroller. By determining the data clock from the equalized signal, clock recovery is easier and more likely to be compatible with an "off-the-shelf" CDR circuit, and also reduces the likelihood of false lock.

The equalizer 210 receives the input signal s(t) as its input, equalizes the signal, and outputs the equalized output signal 220, which is substantially similar to the originally-transmitted signal r(t).

As shown, operation of the channel-compensating equalizer of the present invention can be divided into two main steps: (1) determining the channel response of the channel over which the received signal is obtained; and (2) using the channel response to determine a set of filter coefficients for the equalizer to filter out the effects of the channel response to recover the originally-transmitted signal. Different techniques for implementing each step, in conjunction with different embodiments of the present invention, will be described next. The next two sections describe exemplary techniques for determining the channel response for step (1) (i.e. a "peak detection method" and an "explicit model-fitting method"), followed by an explanation of how to use the channel response to determine the set of filter coefficients, and how to adaptively update the coefficients, for step (2).

C. Channel Response Estimation: Peak Detection Method

To determine the channel response of a channel without requiring a training sequence, one embodiment of the invention computes correlation statistics of the output signal s(t) that are used to determine an estimate $\tilde{h}(t)$ of the true channel response, without direct knowledge of any portion of the input bit stream. This embodiment builds a model of the channel response based on Gaussian peaks (or other peak shapes), and then uses the correlation statistics to determine the relative spacing and height of those peaks.

In this embodiment, a series of correlation statistics are computed based on s(t). Correlation statistics are a measure of the similarity between two signals as a function of time shift between them. Correlation is at a maximum when two signals are similar in shape and in phase (or "unshifted" with respect to each other). In one embodiment, the correlation statistics are autocorrelation functions. Autocorrelation functions are correlations of a signal onto itself. By using autocorrelation functions, any uncorrelated data will drop out of the autocorrelation, or will be represented primarily as a spike that can be filtered out or ignored. In other words, the autocorrelation reduces the data components of the received signal. The remaining information in the autocorrelation will represent the somewhat constant or slowly changing channel response.

In a large volume of data, it can be assumed that the transmitted data is uncorrelated, in part because a typical optoelectronic transmission system for multimode fiber utilizes a scrambler on the transmitter portion to assure that the transmitted data is substantially random. Also, the ratio of framing bits, bits that are less random so as to help define packet boundaries, to payload bits is generally small enough that the framing bits can be compensated for by the microcontroller 206, or, in some applications, may have sufficiently minimal effect as to be ignored. Computed autocorrelation functions are able to be used in embodiments of the invention because noise is relatively small and because the transmitted data is essentially uncorrelated.

Figure 3B:
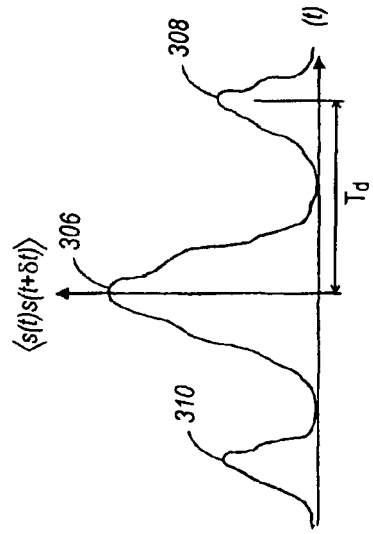
FIG. 3B illustrates a first correlation function of the received signal in FIG. 3A, in accordance with an embodiment of the present invention.
Figure 3D:
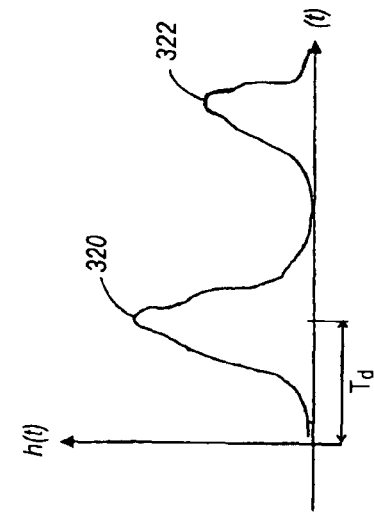
FIG. 3D shows an estimated channel response of the received signal in FIG. 3A determined by methods of the present invention.
Figure 3A:
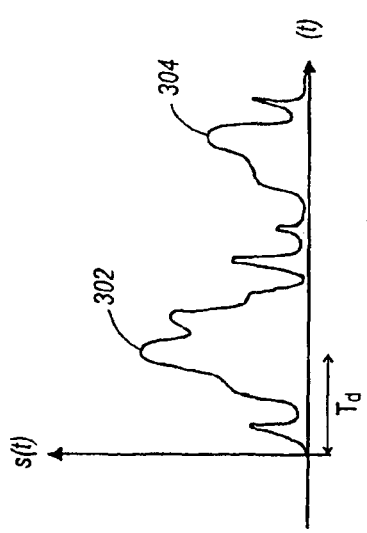
FIG. 3A shows an exemplary received signal.

Referring to FIG. 3A, an example of an output (received) signal s(t) is shown. This output signal represents the received signal after transmission of a single data pulse (representing a logic-high value) transmitted across the channel. Looking ahead to FIG. 3D, the corresponding recovered channel response h(t) (which will be determined in the manner described below) is shown. Comparing the two, it is clear that the received signal s(t) contains additional noise other than the channel response itself. If there were no dispersive effects other than those represented by the channel response, the output signal corresponding to a pulse could be measured directly to determine h(t). But, as shown, there may be other random noise in the channel, or the channel responses corresponding to other nearby pulses may crowd into the current channel response.

In one embodiment, the following three autocorrelation functions (also referred to herein as "correlation statistics") are computed:

$$S_0 = \langle s(t)s(t+\delta t) \rangle - \langle s(t) \rangle^2$$
$$S_1 = \langle s(t)\sqrt{s(t+\delta t)} \rangle - \langle s(t) \rangle \langle \sqrt{s(t)} \rangle$$
$$S_2 = \langle \sqrt{s(t)}s(t+\delta t) \rangle - \langle s(t) \rangle \langle \sqrt{s(t)} \rangle$$

As described, these correlation statistics $S_0$ $S_1$ and $S_2$ do not depend explicitly on the input data sequence x[n]. Furthermore, taken together, they allow an accurate estimate response of the channel impulse response h(t) to be computed. Note that the notation "$\langle \rangle$" means a time-average of the terms inside the brackets.

Importantly, the three correlation functions $S_0$ $S_1$ and $S_2$ illustrated are merely an example of the type of functions that can be used in accordance with the precepts of the present invention. For example, other non-linear terms can be used in place of the square-root function, such as a power function:

$$S_1 = \langle s(t)s(t+\delta t)^4 \rangle - \langle s(t) \rangle \langle s(t)^4 \rangle$$
$$S_2 = \langle s(t)^4 s(t+\delta t) \rangle - \langle s(t) \rangle \langle s(t)^4 \rangle.$$

Other types of non-linear correlation functions and statistics, completely different than those presented above, can also be used as well, so long as whatever functions are used, they have the effect of dropping the data out of the correlated function and revealing the channel response. In one embodiment of the invention, each of the terms of the autocorrelation functions above are measured separately. The terms may then be combined by a microcontroller. Additional information may be provided to the microcontroller for estimating the channel response by taking correlation functions at other points in the equalizer. For example, the signal:

$$\langle q(t)q(t+\delta) \rangle$$

may be measured and calculated where q(t) is the signal at an intermediate point within the equalizer.

One of skill in the art will appreciate that s(t) may be sampled by an analog-to-digital (A/D) converter, the samples stored in a semiconductor memory, and the computations necessary to compute the above quantities carried out on a microcontroller. Alternatively, the correlation statistics can be computed using analog circuitry—for example, using analog-multiply circuits, analog circuits that measure a time average by built-up voltage on a capacitor, and analog circuits that determine square-root and power-law functions. Computing using analog circuitry may be preferable to avoid overloading the microcontroller.

In the present embodiment, it is assumed that the channel impulse response is characterized by a discrete number of peaks, as depicted by peaks 320 and 322 in FIG. 3D. Recall that in multimode fiber, different modes travel with different velocities down the fiber. This results in a delay, $T_d$, between the arrival of each mode at the receiving end of the fiber. (Hence, the x-axes of FIGS. 3A–3D are time t). This delay, as well as the relative heights of the two-peak (320 and 322) channel response, can be derived from the correlation statistics, as will be shown. Note that peaks 302 and peaks 304 of the received signal s(t) correspond to peaks 320 and 322; however, the received signal s(t) contains the additional aforementioned noise and convolved data.

Referring to FIG. 3B, correlation statistic $S_0$ exhibits three peaks. The central peak 306, centered on the x-axis, i.e. y=0, results from the computation of the correlation $S_0$ when there is no delay. In other words, $S_0$ is s(t) multiplied by itself. Thus, in accordance with the equation above, the height of peak 306 will be generally proportional to the square of the height of peak 302 (corresponding to channel-response peak 320) plus the square of the height of peak 304 (corresponding to channel-response peak 322). (Note that this is just an approximation, however, as other smaller peaks will also be multiplied times themselves and added to the height of peak 306, but their effects substantially drop out with the other peaks, as well as with correlation statistics $S_1$ and $S_2$ as will be explained).

Peak 308 in $S_0$ from the computation of correlation $S_0$ when the delay, $\delta t$, is equal to the intermode delay $T_d$. In this case, the height of peak 308 will be proportional to the height of peak 302 (corresponding to channel-response peak 320) multiplied by the height of peak 304 (corresponding to channel-response peak 322). This is because, after shifting s(t) over by $T_d$, peak 302 is multiplied by zero (or some small value approaching zero), peak 302 is multiplied by peak 304, and peak 304 is multiplied by zero (or some small value), resulting in a predominance of the product of peaks 302 and 304. The noise surrounding peaks 302 and 304 is assumed to be random (uncorrelated), and should effectively drop out because it will be multiplied by zero or a small number.

Peak 310 is equal in height to that of peak 308, as it results from the computation of correlation $S_0$ when the delay, $\delta t$, is equal to negative of the intermode delay $T_d$. Thus, no new information is gained from examining the position or height of peak 310.

The intermode delay $T_d$ can be determined by the distance between peaks 306 and 308, because peak 308 is positioned at $\delta t=T_d$. Also, there are two relationships known about the height of peak 320 ($h_{320}$) and the height of peak 322 ($h_{322}$) in the channel response, as they correspond to peaks in the correlation function $S_0$ These relationships can be expressed as:

$$h_{320}*h_{320}+h_{322}*h_{322}=h_{306}$$

$$h_{320}*h_{322}=h_{308}$$

These two equations are most useful for very sharp peaks and for Gaussian peaks with nonzero width. However, these two equations are not sufficient by themselves to unambiguously determine the unknown quantities $h_{320}$ and $h_{322}$.

Figure 3C:
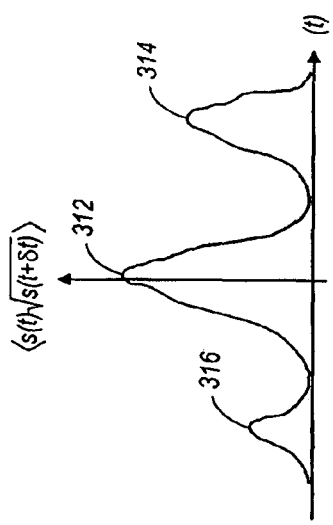
FIG. 3C illustrates a second correlation function of the received signal in FIG. 3A, in accordance with an embodiment of the present invention.

Thus, to uniquely determine the heights of the peaks in the channel impulse response, in some embodiments of the invention additional correlation statistics are considered. Referring to FIG. 3C, correlation statistic $S_1$ contains three main peaks 312, 314, and 316. Using logic similar to that outlined above in reference to $S_0$, the following three relationships can be determined about the peaks of the channel response and the peaks of the correlation statistic $S_1$:

$$h_{320}^{1.5}+h_{322}^{1.5}=h_{312}$$

$$h_{320v+e,rad} \, h_{320}+ee ==h_{314}$$

$$h_{322v+e,rad} \, h_{320}+ee =h_{316}.$$

What is not shown in these equations, however, is the fact that there is a baseline associated with each peak height in the equations, due to interference with neighboring bits due to the nonlinearlity (i.e. the square root function). However, the microcontroller (or other appropriate digital logic) of the present invention can compensate for the baseline effects, and thus these effects can effectively be ignored. Therefore, these three equations, together with the two equations above related to $S_0$, can be used to uniquely determine $h_{320}$ and $h_{322}$. Methods for the simultaneous solution of nonlinear equations are well known. See, e.g., Chapter 9, pp. 340–386, Numerical Recipes in Fortran 77: The Art of Scientific Computing, 2nd Edition, William H. Press, Saul A. Teukolsky, William T. Vetterling, and Brian P. Flannery, Cambridge University Press, 1992, which is hereby incorporated by reference.

In summary, the procedure for extracting the peak heights/positions for the channel impulse response in the case where two modes are present in the fiber can be summarized as follows:

1. Determine the location of the three peaks in $S_0$;
2. Measure the heights of the largest peak 306 and the smaller peak 308;
3. Measure the heights of the three peaks 312, 314, and 316 in $S_1$; and
4. Determine the intermode delay $T_d$ and the height of the two peaks in the impulse response $h_{320}$ and $h_{322}$.

One of skill in the art will recognize that this procedure is easily generalized to the case of any number of peaks in the impulse response. The peaks can be modeled as a series of Gaussian peaks, for example, with a width corresponding to the pulse width of the received signal, and a height determined by the method described above. The actual number of peaks used for the model can be a predetermined value, or can vary depending on the channel information. Also, while the above-described technique is one example of a method for determining the height and relative positioning of the peaks of the channel response $h(t)$, other methods for determining the channel response can be employed in the present invention. For example, the channel response could be determined partially through measurement (for a pulse) and partially through correlation statistics. Or, the channel response can be determined through an explicit model-fitting procedure—a technique that will be described next.

D. Channel Response Estimation: Explicit Model-Fitting Procedure

In another embodiment, the present invention determines the channel response by computing models of correlation statistics of the output signal $s(t)$, which are then iteratively optimized to determine coefficients that can be used to determine an estimate $\tilde{h}(t)$ of the true channel response. Again, this occurs without direct knowledge of any portion of the input bit stream. The estimated channel response can be used in an active filter to reduce the effects of the true channel response.

In this embodiment, the output signal $s(t)$ is first measured for some period of time $T_m$ and stored. Next, a series of correlation statistics are computed based on $s(t)$. For example, in one embodiment, the following three correlation statistics are computed:

$S_0 = \langle s(t)s(t+\delta t)\rangle - \langle s(t)\rangle^2$
$S_1 = \langle s(t)\sqrt{s(t+\delta t)}\rangle - \langle s(t)\rangle\langle\sqrt{s(t)}\rangle$
$S_2 = \langle \sqrt{s(t)}s(t+\delta t)\rangle - \langle s(t)\rangle\langle\sqrt{s(t)}\rangle$.

These are the same correlation functions $S_0$, $S_1$ and $S_2$ discussed above in the context of the peak detection method. Before explaining how these correlation functions are used to derive the channel response $h(t)$ in this embodiment, it will be established that the correlation functions are data-independent, that is, that they reduce or eliminate the data components of the received signal.

1. Data-Independence of Correlation Statistics.

This embodiment of the invention is understood more readily if the relationship between input data stream $x[n]$ and the input signal $x(t)$ is first considered in more detail. In some embodiments, input data sequence $x[n]$ assumes one of only two values—logic high ($V_H$) or logic low ($V_L$) with a bit period of duration. In this case, $x(t)$ can be expressed as the product of the input sequence convolved with a pulse train, $$x(t) = \sum_{n=0}^{\infty} x[n]p(t-nT_s)$$

The shape of the pulse function $p(t)$ is produced by D/A 102 (See FIG. 1) and is known in practice.

With this description of the input signal, it is possible to express the output signal directly in terms of the input data sequence:

$$s(t) = x(t)*h(t) = \sum_{n=0}^{\infty} x[n]p(t-nT_s)*h(t) = \sum_{n=0}^{\infty} x[n]q(t-nT_s)$$

where $q(t)$ is implicitly defined as the convolution of the pulse $p(t)$ and the channel impulse response. (Note: throughout this document, references to the channel response $h(t)$ may also be references to $q(t)$, interchangeably, with an additional [and generally unnecessary] deconvolution required to derive the actual channel response. For ease of explanation, however, the discussion focuses on the channel response $h(t)$ instead of the convolved channel response and pulse function $q(t)$.

Next, the correlation statistic $S_0$ can be expressed in terms of integrals:

$$S_0 = \langle s(t)s(t+\delta t)\rangle - \langle s(t)\rangle^2 = \int_{-\infty}^{\infty} s(t)s(t+\delta t)\,dt - \left(\int_{-\infty}^{\infty} s(t)\,dt\right)^2$$

Then, using the aforementioned expression for $s(t)$, the first part of $S_0$ can be expressed as:

$$\langle s(t), s(t+\delta t)\rangle = \lim_{T\to\infty} \frac{1}{2T}\int_{-T}^{T}\sum_{n=0}^{\infty} x[n]q(t-nT_s)\sum_{m=0}^{\infty} x[m]q(t+\delta t - mT_s)\,dt =$$

$$\lim_{T\to\infty} \frac{1}{2T}\int_{-T}^{T}\sum_{n=0}^{\infty} x^2[n]q(t-nT_s)q(t+\delta t - nT_s)\,dt =$$

$$\sigma^2 \int_{-\infty}^{\infty} q(t)q(t+\delta t)\,dt$$

where $\sigma$ is the standard deviation of the input data stream (a known quantity), and it has been assumed that the input data stream is uncorrelated, as discussed previously. The second part of $S_0$, while not set forth here, is similar.

The important fact to glean from this analysis is that the expression for $S_0$ depends only on the standard deviation of the input sequence, the pulse function $p(t)$, and the channel response $h(t)$. Knowledge of the input sequence itself, $x[n]$, is not required to compute $S_0$ via the above expression so long as the bits in $x[n]$ are uncorrelated.

2. Estimate of Channel Response From Statistics

Because the correlation statistics are independent of the input data sequence $x[n]$, the channel impulse response $h(t)$ can be computed directly from these statistics. First, an estimated impulse response $\tilde{h}(t)$ is parameterized in terms of a finite number of unknown coefficients:

$$\tilde{h}(t) = \sum_{m=1}^{M} \lambda_m b_m(t)$$

In this expression, the m-basis functions $b_m(t)$ are known functions of time and the M expansion coefficients $\lambda_m$ are to be determined. Approximation of unknown functions by a finite number of basis functions is well-known in the art of numerical computation. For example, the basis function $b_m(t)$ could be cubic splines, Legendre polynomials, or wavelets. The basis functions $b_m(t)$ in this embodiment would be predetermined by the computational logic, and could be dynamically optimized.

The expansion coefficients $\lambda_m$ are determined by modeling the correlation statistics $\tilde{S}_0$, $\tilde{S}_1$, and $\tilde{S}_2$ based on the expansion coefficients, using a curve-fitting optimization (e.g. a steepest-descent function) to determine the best coefficients, and, once determined, using the same coefficients to determine the model of the channel response. Each correlation statistic is first expressed in terms of the expansion coefficients:

$$\tilde{S}_{0(\delta t)=f0}(\lambda_1, \lambda_2, \ldots, \lambda_M, \delta t) = f(\lambda, \delta t)$$

where the notation $\lambda$ is a shorthand for the M-vector of the expansion coefficients. Other correlation statistics can be similarly estimated.

Next, an initial set of expansion coefficient $\lambda_m$ are determined, to provide the initial model for each correlation statistic. In one embodiment, these initial values for the coefficients are predetermined by the computational logic (like the basis functions), and could, as one example, simply be set to zero. In another embodiment, the initial values for the expansion coefficients could be determined by the peak detection method described above. By comparing a model of the correlation statistics, based on the initial expansion coefficients, with the actual computed correlation statistics, the coefficients can be iteratively improved or optimized.

Thus, the actual correlation statistics may also be determined, by measuring the received signal s(t) (e.g., by sampling the signal with an A/D converter), and by computing the correlation statistics $\tilde{S}_0$, $\tilde{S}_1$, and $\tilde{S}_2$ based on the equations described above. Then, to determine the optimal values of the expansion coefficients based on the knowledge of the actual correlation statistics, a scalar function is defined:

$$E(\lambda) = \sum_i \sum_{\delta t} \left(S_i(\delta t) - \tilde{S}_i(\delta t)\right)^2$$

The purpose of the scalar error function is to denote the error between the actual correlation statistics and the modeled correlation statistics, summed over the total number of statistics (e.g. two in this case). Thus, by minimizing the value of the scalar error function, the modeled correlation statistics are optimally "fit" to the actual correlation statistics, and hence the optimal set of expansion coefficients is determined.

Minimization of error functions is well-known in the art of numerical analysis. For example, the steepest descent procedure can be used to minimize the error function. Alternatively, any other suitable type of numerical optimization may also be used. Other methods, including but not limited to simulated annealing and genetic algorithms, could also be used to minimize the error function. See Chapter 10, pp. 387–448, Press et al., which is hereby incorporated by reference.

In the steepest descent procedure, the best current estimate of the expansion coefficients are iteratively improved in accordance with the following relation:

$$\lambda^{i+1} = \lambda^i - \beta \nabla E(\lambda^i)$$

where i is the number of the current iteration, $\beta$ is a coefficient, and $\nabla$ denotes the gradient with respect to the expansion coefficients. The iterations can be stopped when the change in estimates of the expansion coefficients becomes small in some norm. This type of iterative calculation can be quickly conducted by a microcontroller, or by specialized digital circuitry in an alternative embodiment.

In one embodiment of the invention only the autocorrelation function $$S_0 = \langle s(t)s(t+\delta t) \rangle - \langle s(t) \rangle^2$$

is calculated. The relation used for the steepest decent procedure may be modified to read as follows:

$$\lambda_j^{i+1} = \lambda_j^i - \left(1.0 + \frac{(j-p)}{10} * b\right) \beta \nabla_j E(\lambda^i)$$

Here, p is the center of the peak of h(t). The parameter b is an adjustable bias that in one embodiment may be between +1.0 and −1.0. Other values may also be used. However, if b becomes too large, the relation may become unstable. The parameter j is the index of the cubic spline. The effect of the bias parameter b is to make the steepest decent fall downhill more quickly in a particular direction.

The microcontroller may need to try several different values of b until it finds one that properly opens the eye and provides a suitable BER. In one embodiment of the invention, such as in the case of when the 10 Gigabit Ethernet standard is applicable, the BER is specified as less than $10^{-12}$. Experimental results have shown that only a few different values of b may need to be calculated to obtain a BER less than $10^{-12}$. For example, in one experiment using an NIST cable, a BER less than $10^{-12}$ was obtained for six out of eleven values for b ranging from −1 to +1 in 0.2 increments.

Finally, once the set of coefficients that best minimizes the error function is determined, the computational logic will use those coefficients, together with the basis functions $b_m(t)$, to determine the model of the channel response $\tilde{h}(t)$. By using these techniques, the modeled channel response $\tilde{h}(t)$ should be approximately equal to the actual channel response h(t).

Once the channel response h(t) has been approximated in an open loop approximation, embodiments of the present invention may continue to adjust the approximation of h(t). Adjusting the approximation may be done in response to closing a feedback loop. The feedback loop monitors the output of the equalizing filter and recursively adjusts the coefficients of the equalizing filter appropriately to open the eye. Empirical results have shown that embodiments of the present invention operating closed loop provide a lower BER than open loop embodiments, where h(O) is approximated but not adjusted. Thus, open loop approximation is useful for initial acquisition while closed loop helps to give a lower BER once a signal is acquired.

Still another method that can be used to compensate for the channel response is related to spurious "ghost peaks" that appear in h(t). These ghost peaks most often appear when an optical signal is launched onto the fiber in a center launch condition. This may be due to the non-symmetry of the channel response (i.e. h(t)≠h(−t)) in the center launch condition. The method involves improving the open loop approximation of h(t) by selectively trimming the ghost peaks. Selectively trimming is accomplished by zeroing out the corresponding expansion coefficients during the steepest decent procedure. It may not be known in advance if a peak is a ghost peak or not, but by trial and error, different combinations can be tried until the eye is open.

E. Design of Equalizing Filter

The second general step of the present invention is to apply the calculated channel response (whether determined by the peak detection method, by the model-fitting method, or by an alternative correlation technique) to obtain filter coefficients for the equalizer. In other words, the equalizer uses the channel response h(t) to cancel out or reduce the effects of the channel response, and to equalize the received signal s(t). In one embodiment of the present invention, adaptive equalization is performed by an infinite impulse response (IIR) equalizer with a minimum mean squared error (MMSE) filter.

Figure 4:
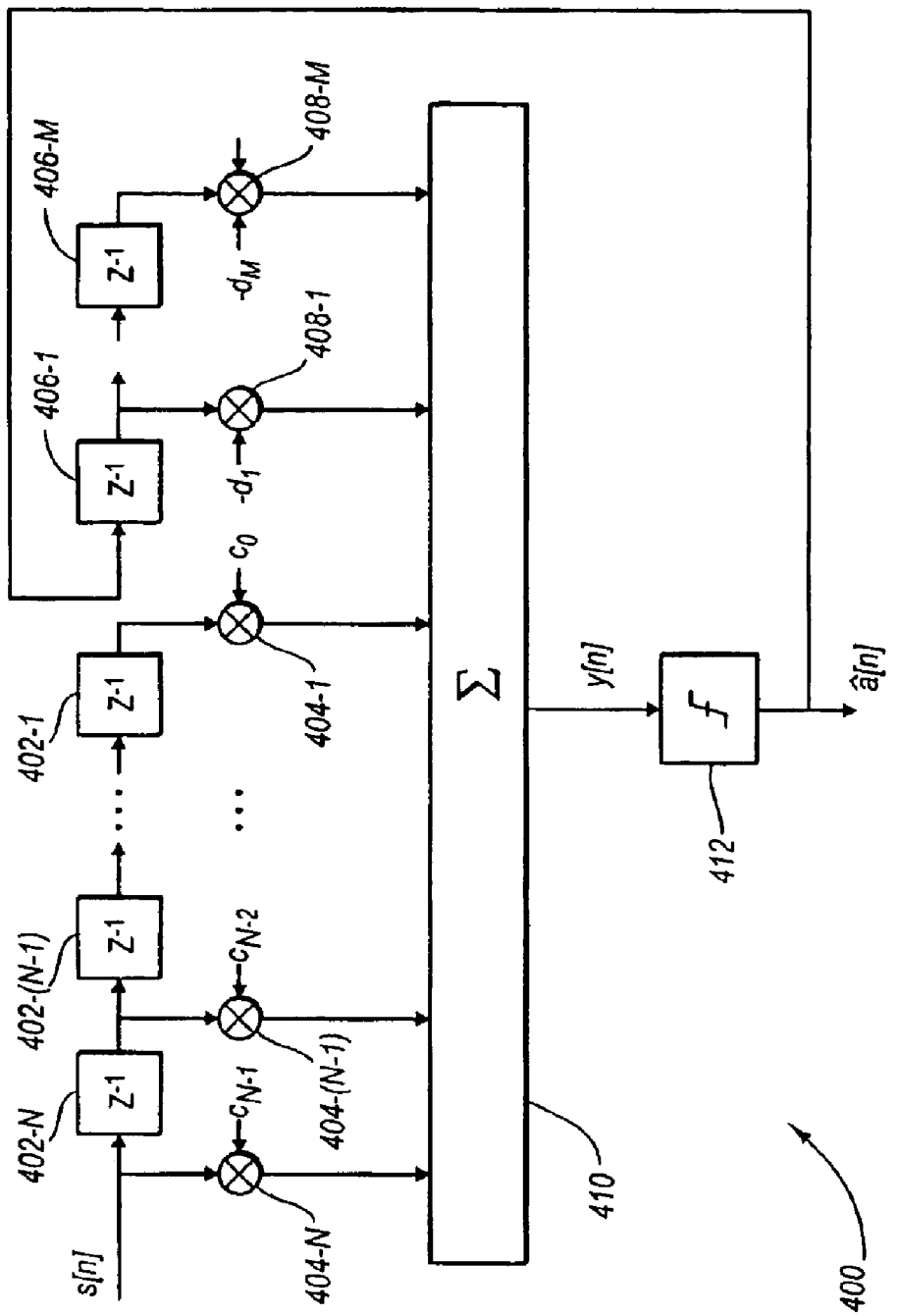
FIG. 4 is a block diagram of an infinite impulse response filter, in accordance with an embodiment of the present invention.

The IIR equalizer is designed to minimize the expected squared error between the estimate of the current data symbol â[n] and the true data symbol and the equalized signal y[n]. The filter may be implemented purely in digital hardware, purely in analog hardware, or in a combination of analog and digital hardware. Referring to FIG. 4, IIR filter 400 includes:

a number of one-bit delays 402-1 ... N in an N-order precursor section for canceling intersymbol interference (ISI) from future data symbols;

a number of coefficient multipliers 404-1 ... N in the precursor section;

precursor coefficients $c_0, c_1, \ldots, c_{N-1}$;

a number of one-bit delays 406-1 ... M in an M-order postcursor section for canceling intersymbol interference (ISI) from past data symbols;

a number of coefficient multipliers 408-1 ... M in the postcursor section;

postcursor coefficients $d_1, d_2 \ldots d_M$;

summer 410 for combining the results of the pre- and postcursor filters; and slicer 412 for estimating the current data symbol based on the combined output of the precursor and postcursor filters.

The number of nonzero coefficients N in the precursor filter and the number of coefficients M in the postcursor filter impact both the cost and performance of the DFE in estimating the true data symbol. Generally, larger number of coefficients will lead to more accurate estimation of the true data symbol, but will be more expensive to implement in hardware. Conversely, smaller numbers of coefficients will generally lead to less reliable estimation of the true data symbol, while requiring a lower cost to implement in hardware. Examples of possible choices of N and M include N=8 and M=16, but there are always design tradeoffs that must be made in practice in selecting these values.

The actual number of coefficients in the precursor and postcursor sections of filter 400 are determined by a designer before construction of the filter, and do not change for a given implementation. On the other hand, the coefficients $c_0, c_1, \ldots, c_{N-1}$ and $d_1, d_1, \ldots, d_M$, are computed both before and during the operation of the filter. Computation of the coefficients is accomplished by the microcontroller 206 (See FIG. 2) with a routine that receives the current estimate of the channel response as an input, and returns the optimal (from an MMSE standpoint) coefficients as an output.

To more clearly explain the routine for determining optimal coefficients, the following notation is first defined:

$$h[n] = h(nT_s + \delta),$$

where n is an integer representing a sample number, $T_s$ is the sampling period (the arithmetical inverse of the data transmission rate), h(t) is the channel response and δ is an offset that adjusts alignment of the channel response with respect to the filter. δ preferably ranges for 0 to 1 bit ie. 1 to 100 picoseconds for a 10 Gb/s data stream. δ may be adjusted by the microcontroller to optimize performance. This can be done by estimating a signal to noise ratio as a function of δ and picking the best result. Allowing n=0 to refer to the first nonzero sample of the channel response, a vector of channel response samples is defined as:

$$h = \sigma_a^2 \begin{bmatrix} h[-(N-1)] \\ h[-(N-2)] \\ \vdots \\ h[0] \end{bmatrix},$$

where σ is the standard deviation of the input data symbol sequence a[n]. It is also convenient to define the autocorrelation matrix of the $$\Phi = \begin{bmatrix} \phi_{-(N-1),-(N-1)} & \phi_{-(N-1),-(N-2)} & \cdots & \phi_{-(N-1),0} \\ \phi_{-(N-2),-(N-1)} & \ddots & & \vdots \\ \vdots & & & \vdots \\ \phi_{0,-(N-1)} & & \cdots & \phi_{0,0} \end{bmatrix}$$

where the individual matrix elements are given by:

$$\hat{\phi}_{j,m} = \sum_{k=-\infty}^{0} h[j+k]h[m+k] + \sum_{k=M+1}^{\infty} h[j+k]h[m+k]$$

Finally, the unknown coefficients of the precursor filter are denoted:

$$c = \begin{bmatrix} c_0 \\ c_1 \\ \vdots \\ c_{N-1} \end{bmatrix}.$$

In observance of the notations defined above, the coefficients of the precursor filter that yield an MMSE behavior are:

$$c = (\Phi + \epsilon I)^{-1} h \qquad \text{(Eq.A)}$$

(where I is the identity matrix and ε is a small positive number to prevent zero eigenvalues in order to reduce divergence of the inverse matrix), with corresponding postcursor coefficients:

$$d_m = \sum_{i=-(N-1)}^{0} c_{-i} h[m-i], \quad 1 \leq m \leq M \qquad \text{(Eq. B)}$$

To solve the equations (A) and (B) for the various coefficients requires knowledge of the channel response and the exact autocorrelation statistics of the input data symbol sequence. This is where the first general step of the present invention, estimating the channel response, is pertinent. In accordance with the explanations above, the correlation statistics of the input data symbol sequence are determined (e.g., $S_0$, $S_1$ and $S_2$), and the channel response is estimated.

Then, with this information, the procedure for calculating the tap weights of the filter in one embodiment of the present invention is as follows:

1. Compute and store the N-vector $$\hat{h} = S_0(0) \begin{bmatrix} \hat{h}[-(N-1)] \\ \hat{h}[-(N-2)] \\ \vdots \\ \hat{h}[0] \end{bmatrix};$$

2. Compute and store the N-by-N matrix $$\hat{\Phi} \begin{bmatrix} \hat{\phi}_{-(N-1),-(N-1)} & \hat{\phi}_{-(N-1),-(N-2)} & \cdots & \hat{\phi}_{-(N-1),0} \\ \hat{\phi}_{-(N-2),-(N-1)} & \ddots & & \\ \vdots & & & \\ \hat{\phi}_{0,-(N-1)} & \hat{\phi}_{0,-(N-2)} & \cdots & \hat{\phi}_{0,0} \end{bmatrix}$$

where each element is computed in accordance with the formula $$\hat{\phi}_{j,m} = \sum_{k=-\infty}^{0} \hat{h}[j+k]\hat{h}[m+k] + \sum_{k=M+1}^{\infty} \hat{h}[j+k]\hat{h}[m+k];$$

3. Solve the matrix equation $\hat{c} = (\hat{\Phi} + \epsilon I)^{-1}\hat{h}$, yielding an approximation $\hat{c}$ of the optimal precursor tap weights; and
4. Compute an approximation of the optimal postcursor tap weights via the formula $$\hat{d}_m = \sum_{i=-(N-1)}^{0} \hat{c}_{-i}\hat{h}[m-i], \ 1 \leq m \leq M.$$

To solve the matrix equation in step 3, methods for the solution of sets of linear equations are employed in one embodiment, such as lower-upper (LU) decomposition and back-substitution, conjugate gradient (CG) iteration, and generalized minimum residual (GMRES) iterations. See, generally, Chapter 3 and Chapter 10, Matrix Computations, 3rd Ed., G. H. Golub and C. F Van Loan, The Johns Hopkins University Press, Baltimore, Md., 1996, which are hereby incorporated by reference. One of skill in the art will recognize that the matrix $\hat{\Phi}$ is a Topelitz matrix. See, e.g. Section 4. 7, pp. 193–205, Matrix Computations, 3rd edition, Gene H. Golub and Charles F. Van Loan, John Hopkins University Press, 1996. Thus, in one embodiment, The Levinson algorithm is employed to solve the matrix equation $\hat{c} = \hat{\Phi}^{-1}\hat{h}$ pseudocode implementation of the Levinson algorithm is shown in Table 1:

TABLE 1

1. set $y_1 = -\hat{\phi}_1$, $\hat{c}_0 = \hat{h}[-N-1]$, $\beta = 1$, $\alpha = -\hat{\phi}_1$
2. k=1 to N −1 do $$\beta = (1-\alpha^2)\beta; \mu = \left( \hat{h}[k+1-N] - [\hat{\phi}_1 \cdots \hat{\phi}_k] \begin{bmatrix} \hat{c}_{k-1} \\ \hat{c}_{k-2} \\ \vdots \\ \hat{c}_0 \end{bmatrix} \right) \Big/ \beta$$

TABLE 1-continued $$v = \begin{bmatrix} \hat{c}_0 \\ \hat{c}_1 \\ \vdots \\ \hat{c}_{k-1} \end{bmatrix} + \mu \begin{bmatrix} y_k \\ y_{k-1} \\ \vdots \\ \hat{y}_1 \end{bmatrix}$$

$$\begin{bmatrix} \hat{c}_0 \\ \hat{c}_1 \\ \vdots \\ \hat{c}_k \end{bmatrix} = \begin{bmatrix} v \\ \mu \end{bmatrix}$$

if k < N −1 then $$\alpha = \left( -\hat{\phi}_{k+1} + [\hat{\phi}_1 \hat{\phi}_2 \cdots \hat{\phi}_k] \begin{bmatrix} y_k \\ y_{k-1} \\ \vdots \\ 1 \end{bmatrix} \right) \Big/ \beta$$

$$z = \begin{bmatrix} z_1 \\ z_2 \\ \vdots \\ z_k \end{bmatrix} = \begin{bmatrix} y_1 \\ y_2 \\ \vdots \\ y_k \end{bmatrix} + \alpha \begin{bmatrix} y_k \\ y_{k-1} \\ \vdots \\ y_1 \end{bmatrix}$$

$$\begin{bmatrix} y_1 \\ y_2 \\ \vdots \\ y_{k+1} \end{bmatrix} = \begin{bmatrix} z \\ \alpha \end{bmatrix}$$

end
end

In summary, given an estimate of the channel response (embodied by the channel impulse response coefficients $\hat{h}[0], \hat{h}[1] \ldots \hat{h}[N-1]$), and measurements of $S_0$, $S_1$ and $S_2$, the optimal tap weights of the IIR filter depicted in FIG. 4 can be determined. One feature of the present invention is the ability to update the estimates of the tap weights based on changes in the estimate of the channel response. This is accomplished using a scheme for adaptive equalization. In such a scheme, adaptive equalization is done periodically by reapplying the channel response approximation. Alternatively, adaptive equalization could be performed by using a closed loop filter such as will be discussed in more detail below in conjunction with the description of FIG. 5.

The adaptive equalization can be done, for example, at a 1 ms rate which is 10,000,000 times slower than the 10 Gb/s data rate. As long as the equalizer is adaptive enough to be responsive to changing channel conditions, the microcontroller 206 can be slower than the sample rate, and hence utilize slower, less expensive, and less power-consumptive D/A and A/D converters.

Other variations constitute part of the present invention as well. For example, in one embodiment, the equalized and estimated data symbol â[n] is used as an estimate of the most recent data symbol transmitted into the channel. Further, the output y[n] is used to drive a timing recovery circuit (See FIG. 2) in one embodiment. Timing recovery circuits are well known in the art of digital signal processing (DSP). See Chapter 17, pp. 737–764, Digital Communication, Second Edition, Edward A. Lee and David G. Messerschmitt, Kluwer Academic Publishers, Boston, USA, 1994, which is hereby incorporated by reference. Additionally, in other embodiments, the equalizer may be a decision-feedback equalizer (DFE) that determines updated filter coefficients using an error signal determined from the differences in the pre- and post-slicer signals. Also, the DFE may optionally contain a finite impulse response (FIR) filter on its front end.

In fiber-optic communication environments, the invention may be implemented in numerous locations including for example as a portion of a post amplifier or as a portion of a clock data recovery circuit. The invention may also be implemented as a discrete tuning tool to discover the channel response of a particular channel. The discrete tuning tool may then be removed and an appropriate compensator placed in the channel. Other configurations, although not enumerated here, are also within the scope of the invention.

While the above examples have been framed in the context of multi-mode fiber dispersion, the systems and methods described above may be useful in other applications including but not limited to chromatic dispersion compensation, polarization mode dispersion compensation, or applications requiring equalization of high-speed electrical signals. Specifically, in one embodiment of the invention, the systems and methods described above may be used when high frequency electrical signals are input into any device, such as a printed circuit board transmission line or any other electrical path. Excessive dispersion may be equalized after traveling through the device by using the methods and systems described above.

Figure 5:
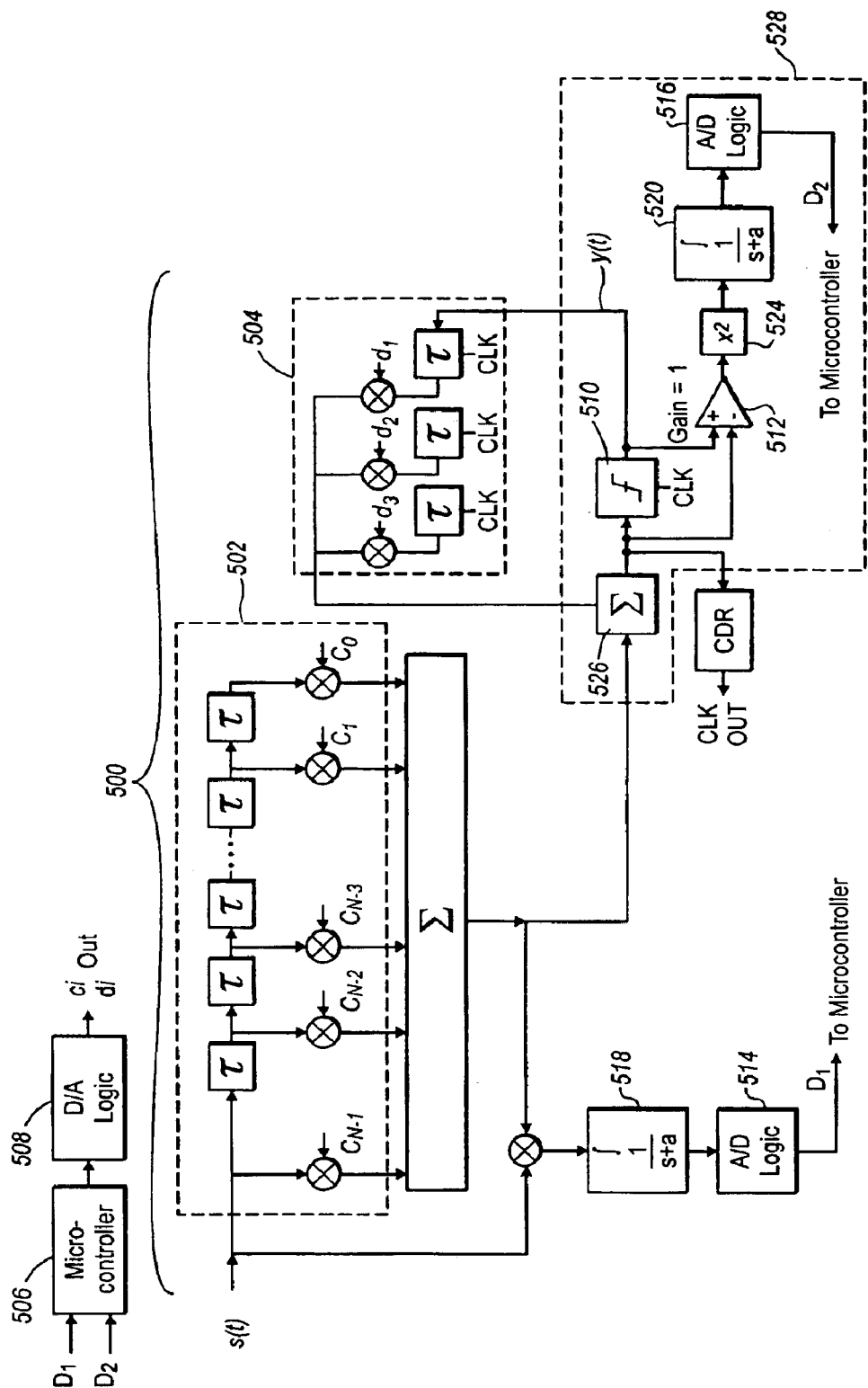
FIG. 5 is a block diagram of an infinite impulse response filter, in accordance with an embodiment of the present invention.

FIG. 5 illustrates one embodiment of the invention similar to the embodiment shown in FIG. 4. The embodiment in FIG. 5 finds particular usefulness in an embodiment where only the single autocorrelation function $S_0$ is calculated. The embodiment shown in FIG. 5 illustrates an analog IIR filter 500. The analog IIR filter includes a precursor section 502 and a postcursor section 504. The embodiment shown in FIG. 5 includes various other computational, devices, logic devices, comparators, and so forth similar to those shown in FIG. 4 and understood as using principles applicable to the components of FIG. 4. The analog IIR filter 500 interfaces with a microcontroller 506. The microcontroller 506 is configured to predict a channel response from a calculated correlation statistic. The channel response has a number of expansion coefficients. The microcontroller 506 can apply a steepest decent procedure to optimize the expansion coefficients. The microcontroller 506 generates filter coefficients from the optimized expansion coefficients. The filter coefficients are digitized by D/A Logic 508 and applied to the precursor section 502 and postcursor section 504. Correlation functions can be can be obtained by setting all of the c coefficients in the precursor to zero except for a single c coefficient, which is set to one. For example, to obtain the function $\langle s(t)s(t+2\tau)\rangle$, the microcontroller can set the coefficient c(−N+3)=1 and all precursor coefficients to zero. The A/D logic 514 outputs the appropriate correlation function.

Once a signal has been obtained, the correlation functions are no longer needed. Instead, in closed loop mode, the A/D logic 516 can be used to provide feedback for correcting any changes in the channel response. The analog IIR filter 500 also includes a summer 526, a slicer 510, a differential amplifier 512, a square block 524, and an integrator 520 that are combined to form an error detection block 528 useful for closed loop operation of the analog IIR filter 500. The error detection block 528 may detect increases in the BER. This allows the microcontroller 506 to monitor for time varying aspects of the channel response and to adaptively update the expansion coefficient in response to the time varying aspects of the channel response.

Advantageously, embodiments of the present invention can be implemented with a reduced architecture. Namely, embodiments of the invention can be implemented with 2 A/D logic blocks 514, 516 where only one is needed at any given time, two integrators 518, 520 where only one is needed at any given time, one additional multiplier 522 and one square function 524 only one of which is needed at any given time. To save power, when any of the components above are not in use, they can be powered down. Further by maintaining a low clock rate for the microcontroller 506, power consumption can be kept very low.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Appendix A

Notation

Throughout this document, the following notations are used:

E[x]—the statistical expectation, or mean, of random variable (r.v.)$^x$. For a discrete r.v., the expectation can be explicitly evaluated via $$E[x] = \sum_j jP(x = j),$$

where the summation is performed over all possible values of the r.v. and P(x=j) denotes the probability that the r.v. assumes the value j.

$\phi_x$ the standard deviation of r.v.x. For any r.v., the standard deviation can be explicitly evaluated via $\phi_x = \sqrt{E[x^2] - E[x]^2}$.

$\langle f(t) \rangle$—the time-average of a function f(t). The time-average is explicitly given by $$\langle f(t) \rangle = \lim_{T \to \infty} \frac{1}{2T} \int_{-T}^{T} f(s)ds.$$

Note: Under some circumstances, the time-average is a good approximation of the expectation. For example, the function F(t) can sometimes be expressed as the sum of a series of deterministic time functions whose amplitude is modulated by a discrete r.v., $$f(t) = \sum_n x_n p(t - nT_s)$$

where $x_n$ is an instance of the r.v. x, $T_s$ is a deterministic constant and p(t) is a deterministic function of time having zero time-average. In this case, the mean of the r.v. is well-approximated by $E[x] \approx \langle f(t) \rangle$.

A k-vector v is a k-tuple of values $v_1, v_2, \ldots v_k$ and is denoted $$v = \begin{bmatrix} v_1 \\ v_2 \\ \vdots \\ v_k \end{bmatrix}$$

An m-by-n matrix A is a n-tuple of m-vectors $a_1, a_2, \ldots, a_n$ and is denoted $$A = \begin{bmatrix} a_{11} & a_{12} & \cdots & a_{1n} \\ a_{21} & \ddots & & \\ \vdots & & & \vdots \\ a_{m1} & & \cdots & a_{mn} \end{bmatrix}$$

The inner product of two k-vectors v and w is computed as $$\sum_{i=1}^{k} v_i w_i;$$

and is denoted $$\begin{bmatrix} w_1 & w_2 & \cdots & w_k \end{bmatrix} \begin{bmatrix} v_1 \\ v_2 \\ \vdots \\ v_k \end{bmatrix}.$$

The product of an n-by-k matrix A and a k-vector v is a n-vector w. The elements of $w$ are computed in accordance with $$w_i = \sum_{l=1}^{k} a_{il} v_l.$$

This operation is denoted $$\begin{bmatrix} a_{11} & a_{12} & \cdots & a_{1k} \\ a_{21} & \ddots & & \\ \vdots & & & \\ a_{n1} & & \cdots & a_{nk} \end{bmatrix} \begin{bmatrix} v_1 \\ v_2 \\ \vdots \\ v_k \end{bmatrix}$$

or, alternatively, Av.

The inverse of an m-by-m matrix A, when it exists and is unique, is another, possibly different m-by-m matrix denoted by $A^{-1}$. For arbitrary m-vectors v and w, if the matrix A satisfies w=Av its inverse must satisfy $v=A^{-1}w$

What is claimed is:

1. A method for reducing the effects of a channel response in an output signal received from across the channel, the method comprising:
measuring the output signal for a period of time;
calculating a correlation statistic from the measured output signal;
estimating a channel response including a plurality of expansion coefficients by applying a steepest decent procedure to the correlation statistic, wherein the steepest decent procedure includes a bias and optimizes the plurality of expansion coefficients;
determining an estimated channel response from the optimized expansion coefficients;
generating filter coefficients for an equalizing filter from the optimized expansion coefficients; and
passing the output signal through the equalizing filter, to reduce the effects of the channel response whereby an equalized output signal is produced.

2. The method of claim 1, wherein applying a steepest decent procedure comprises applying a steepest decent procedure with a plurality of different bias values until a bias value is used that provides a suitable bit error rate.

3. The method of claim 1, wherein the bias is selected from a range of values.

4. The method of claim 1 further comprising:
monitoring the output of an error detection block of the equalizing filter; and
recursively adjusting the filter coefficients in response to the output of the error detection block.

5. The method of claim 1, further comprising trimming ghost peaks from the equalized output signal including zeroing one or more expansion coefficients in the steepest decent procedure.

6. The method of claim 1, further comprising extracting a clock signal from the equalized output signal.

7. The method of claim 1, further comprising converting the equalized output signal to an electrical signal.

8. A method for reducing the effects of a channel response in an output signal received from across the channel, the method comprising:
measuring the output signal for a period of time;
calculating a correlation statistic from the measured output signal;
estimating a channel response including a plurality of expansion coefficients by applying a steepest decent procedure to the correlation statistic, the steepest decent procedure zeros out expansion coefficients by trial and error to trim ghost peaks and optimizes the expansion coefficients;
determining an estimated channel response from the optimized expansion coefficients;
generating filter coefficients for an equalizing filter from the optimized expansion coefficients; and
passing the output signal through the equalizing filter, to reduce the effects of the channel response whereby an equalized output signal is produced.

9. The method of claim 8 further comprising:
monitoring the output of an error detection block of the equalizing filter; and
recursively adjusting the filter coefficients in response to the output of the error detection block of the equalizing filter.

10. The method of claim 8, further comprising extracting a clock signal from the equalized output signal.

11. A system for reducing the response of a channel on signals passing through the channel, the system comprising:
a correlation block configured to compute a correlation statistic for a signal received from the channel;
a microcontroller coupled to the correlation block, the microcontroller configured to:
predict a channel response of the channel from the correlation statistic, the channel response including a plurality of expansion coefficients;
apply a steepest decent procedure to the correlation statistic that includes a bias, wherein the steepest decent procedure optimizes the plurality of expansion coefficients; and generate a plurality of filter coefficients from the optimized expansion coefficients; and an equalizer coupled to the microcontroller for receiving filter coefficients from the microcontroller, the equalizer adapted to compensate for effects of the channel response included in the signal to produce an equalized output signal.

12. The system of claim 11, wherein the microprocessor is further configured to:

track time varying aspects of the channel response; and adaptively update the expansion coefficients in response to the time varying aspects of the channel response.

13. The system of claim 11, further comprising an error detection block coupled to the equalizer and wherein the microprocessor is further configured to:

monitor a signal from the error detection block; and recursively adjust the expansion coefficients in response to signal from the error detection block.

14. The system of claim 11, wherein the microprocessor is further configured to trim ghost peaks from the equalized output signal by zeroing expansion coefficients by trial and error.

15. A system for reducing the response of a channel on signals passing through the channel, the system comprising:

a correlation block configured to compute a correlation statistic for a signal received from the channel;

a microcontroller coupled to the correlation block, the microcontroller configured to:

predict a channel response of the channel from the correlation statistic, the channel response including a plurality of expansion coefficients;

apply a steepest decent procedure to the correlation statistic that includes zeroing expansion coefficients by trial and error, wherein the steepest decent procedure optimizes the expansion coefficients; and generate a plurality of filter coefficients from the optimized expansion coefficients; and an equalizer coupled to the microcontroller for receiving filter coefficients from the microcontroller, the equalizer adapted to compensate for effects of the channel response to produce an equalized output signal.

16. The system of claim 15, wherein the microprocessor is further configured to:

track time varying aspects of the channel response; and adaptively update the expansion coefficients in response to the time varying aspects of the channel response.

17. The system of claim 11, further comprising an error detection block, wherein the microprocessor is further configured to:

monitor a signal from the error detection block; and recursively adjust the expansion coefficients in response to the signal from the error detection block.

\* \* \* \* \*

UNITED STATES PATENT AND TRADEMARK OFFICE
CERTIFICATE OF CORRECTION

PATENT NO. : 6,909,742 B1
APPLICATION NO. : 10/789622
DATED : June 21, 2005
INVENTOR(S) : Thomas J. Leonosky It is certified that error appears in the above-identified patent and that said Letters Patent is hereby corrected as shown below:

Column 1,
Line 35, change "Ethernet which," to --Ethernet, which--

Column 7,
Line 3, change "$S_0 \, S_1$" to -- $S_0, S_1$ --

Column 8,
Line 45, change "$h_{320v+e,rad} \sqrt{h_{322}} = h_{314}$" to -- $h_{320} \sqrt{h_{322}} = h_{314}$ --

Line 46, change "$h_{322v+e,rad} h_{320} + ee = h_{316}$" to -- $h_{322} \sqrt{h_{320}} = h_{316}$ --

Column 11,
Line 8, change " $\tilde{S}_{0(\delta t)=f_0}(\lambda_1, \lambda_2,...\lambda_M, \delta t) = f(\lambda, \delta t)$" to -- $\tilde{S}_0(\delta t) = f_0(\lambda_1, \lambda_2,...\lambda_M, \delta t) = f(\lambda, \delta t)$ --

Column 12,
Line 43, change "h(o)" to --h(t)--

Column 13,
Line 46, change "$d_1, d_1,...,d_M,$" to -- $d_1, d_2,...,d_M,$ --

Column 14,
Lines 10-11, change "autocorrelation matrix of the" to --autocorrelation matrix as:--
Line 42, change "$c = (\Phi + \in I)^{-1} h$" to -- $c = (\Phi + \varepsilon I)^{-1} h$ --

Column 15,
Line 28, change "$c = (\Phi + \in I)^{-1} h$" to -- $c = (\Phi + \varepsilon I)^{-1} h$ --
Line 45, change "Johns Hopkins" to --John Hopkins--
Line 52, before "Levinson" change "The" to --the--
Line 54, after "Levinson algorithm" change "is" to --as--

Column 16,
Line 38, after "$\hat{h}[0],$" change "$\hat{h}[1,$" to -- $\hat{h}[1],$ --

Column 17,
Line 34, change "computational, devices," to --computational devices,--

Column 18,
Line 40, after "evaluated via" change "$\phi_x =$" to-- $\sigma_x =$ --

UNITED STATES PATENT AND TRADEMARK OFFICE
CERTIFICATE OF CORRECTION

PATENT NO. : 6,909,742 B1
APPLICATION NO. : 10/789622
DATED : June 21, 2005
INVENTOR(S) : Thomas J. Leonosky It is certified that error appears in the above-identified patent and that said Letters Patent is hereby corrected as shown below:

Column 19,
Line 34, after "elements of" change ""$w$"" to --w--
Lines 54-55, change " $v = A^-_1 w$" to -- $v = A^{-1} w$ --

Signed and Sealed this

Fourteenth Day of August, 2007

JON W. DUDAS
*Director of the United States Patent and Trademark Office*